Aug. 24, 1948.      W. M. MUELLER ET AL      2,447,958
VARIABLE PITCH V-TYPE PULLEY
Filed Dec. 26, 1946

INVENTOR.
WILLIAM M. MUELLER
& JOHN E. HECKETHORN
By Martin E. Anderson
ATTORNEY Patented Aug. 24, 1948

2,447,958

UNITED STATES PATENT OFFICE 2,447,958

VARIABLE PITCH V-TYPE PULLEY

William M. Mueller, Denver, and John E. Heckethorn, Littleton, Colo., assignors to The Gates Rubber Company, Denver, Colo., a corporation of Colorado Application December 26, 1946, Serial No. 718,418

3 Claims. (Cl. 74—230.17)

This invention relates to improvements in variable pitch V-type belt pulleys.

It frequently happens that machines driven by V-type power transmission belts, require speed ratios that are not readily available in pulleys of fixed pitch diameters. It also happens that after a machine has been built and put into use, a change in some belt drive ratio becomes necessary to produce the best operation.

It is the general object or purpose of this invention to produce an adjustable V-type pulley assembly of such construction that with the same pulley a large number of different pitch diameters may be obtained within a prescribed limit.

A further object is to produce an adjustable pulley of such construction that the adjustments can be made without any appreciable alteration in the alignment, and with the maximum degree of accuracy and balance.

Another object is to produce a pulley of such construction that the adjustments can be made with great accuracy and with the use of only a few simple tools.

Another object is to produce a pulley of the type indicated that shall be so designed that it may be economically manufactured by using the stock to the best advantage.

The above and any other objects that may become apparent as the description proceeds, are obtained by means of a construction and an arrangement of parts that will now be described in detail, reference for this purpose being had to the accompanying drawing on which the invention has been illustrated, and in which:

Figure 1;

Figure 1:
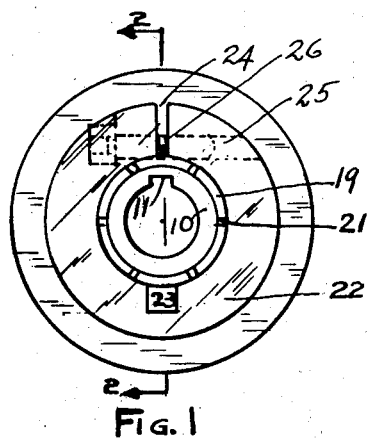
Figure 1 is an end elevation of the improved pulley looking in the direction of arrow 1, in Figure 2.

In the drawing reference numeral 10 designates a cylindrical tubular hub having a key slot 11 along one side. The outer surface of the hub is provided with a threaded section having a number of turns of square threads like those designated by reference numeral 12 and shown in enlarged section in Figure 3. The end of the hub towards the right, when viewed as in Figure 2, has an outwardly extending flange 13 that forms a stop for a flanged female member 14 which is provided at its end with a rabbet for the reception of flange 13. The outer surface of the hub is ground to a prescribed diameter and the opening in part 14 is machined to a tight pressed fit. The part 14 is pressed onto the hub with suitable presses designed for this purpose. The inner surface of flanged member 14 is frusto conical and outwardly inclined as shown at 15 and forms one side of a V-shaped groove. The part of member 14 outside of the tapered shoulder 16 is preferably decreased in thickness so as to form a flange 17. A set screw 18 may be employed, if desired, to hold member 14 in place. It is also permissible to omit flange 13 and the corresponding rabbet when the member is applied with a sufficiently tight fit to assure its permanent retention. Threads 12 extend to the extreme left of the hub, when viewed as in Figure 2, and threadedly connected with this part of the hub is another flanged member having a sleeve 19 that has on its inner surface at least one complete turn of threads 20 for cooperative engagement with threads 12 on the hub. Sleeve 19 is provided with a number of angularly spaced cuts 21 and is surrounded by a locking ring 22. This ring has a notch 23 that is opposite the cut 24. The opening in the ring is dimensioned to fit snugly the outside of sleeve 19. The ends of ring 22 shown at the top in Figure 1, are provided with a chordal opening 25. That part to the right in Figure 1 is threaded and the part to the left is unthreaded. A bolt 26 is inserted into the chordal opening and serves to tighten the locking ring against the outer surface of sleeve 19, thereby forcing the inner surface of the sleeve into engagement with the cylindrical outer surfaces of the threads. The ground cylindrical surfaces have been designated by reference numeral 27 in Figure 3.

The pulley that has just been described is applied to a shaft of suitable diameter and held against rotation by the usual key for which a slot 11 has been provided. The flanged member whose sleeve has been designated by reference numeral 19 has an outwardly flaring frustoconical surface 15a that cooperates with the opposed surface 15 to form a V-groove for the reception of a V-type transmission belt. By loosening the locking ring and rotating the flanged member to whose sleeve the locking ring is secured, the distance between the opposed surfaces 15 and 15a can be adjusted and this, in turn, determines the pitch diameter for a particular sized belt.

After the proper adjustments have been made, the locking ring is tightened by means of bolt 26 and the parts are then ready for operation. If and when an adjustment of the pitch is to be made, the locking ring must be loosened after which the flanged female member with which it is connected is rotated and moved in the nature of a nut, bringing the surfaces 15 either closer together or farther apart, as may be desired.

Figure 4:
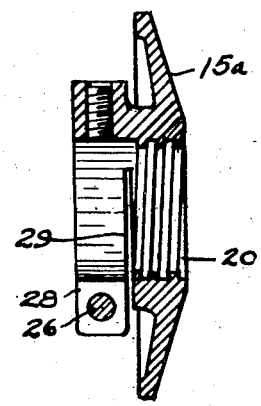
Figure 4 is a diametrical section showing a slightly modified form of the invention.
Figure 5:
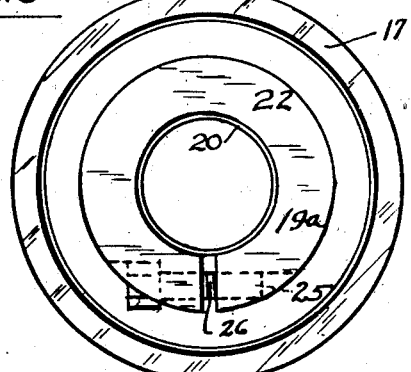
Figure 5 is an end elevation similar to that shown in Figure 1 and shows the modified part illustrated in Figure 4 substituted for the corresponding part shown in Figures 1 and 2.

In Figure 4, a slightly modified form of construction has been shown. In this form the member having the split sleeve is now provided with a sleeve 19a of considerable thickness and split at one side as indicated at 28. A slit 29 is cut inwardly from one side as shown in Figure 4 so as to leave the two end portions of the sleeve loose. These end portions are provided with openings similar to those shown in Figure 1, opening 25 being threaded and the opening in the other end free from threads. A screw 26 is provided for tightening the hub 19a against the outer edges of the threads. It will be seen that the construction shown in Figure 4 is quite analogous to the one shown and described in connection with Figures 1 and 2 and when constructed as shown in Figure 4, there is no likelihood of the parts becoming separated as might happen in connection with locking ring 22.

Figure 2:
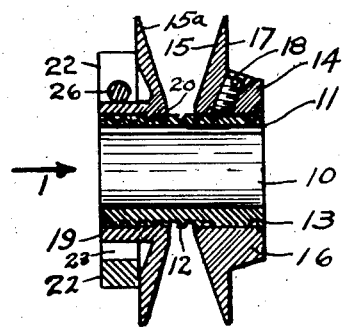
Figure 2 is a section taken on a diametrical line 2—2.
Figure 3:
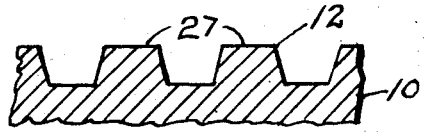
Figure 3 is a fragmentary sectional detail showing the type of thread employed.
Figure 6:
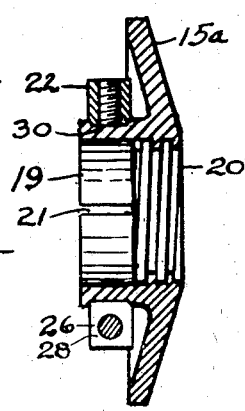
Figure 6 illustrates a still further modification.

In Figure 6 the construction illustrated is the same as that which has been shown in Figures 1 and 2 with this exception, that the locking ring 22 is positioned in a chamfered groove which has been designated by reference numeral 30. The groove assures that the ring does not readily become separated from the other part or lost during handling. When constructed as in Figure 6, the sleeve 19 must be provided with longitudinal cuts 21 so that it is free to yield in response to the contracting pressure.

In all of the views, the adjustable flange member has been shown as provided with a number of threads 20 which must be of the same shape and size as the threads on the cylindrical hub. These threads are for the purpose of moving the member longitudinally while it is rotated. Since the member is frictionally clamped when in adjusted position, there is very little strain on these threads and the number of complete threads may therefore be reduced to a single turn or less, if desired. However, it is preferable to have a plurality as shown in the drawing.

It will be observed from Figure 2 that the two flanged female members are positioned in opposed relation so as to form a V-groove. In Figure 1 the annular member is intended to be positioned and held against longitudinal movement and for this reason the outer surface of the hub has not been threaded along its entire length. It is possible to employ two identical members, either like that shown in Figure 4, or like that shown in Figure 6 to form a pulley. In such a case the hub is threaded throughout its entire length and either flange may be adjusted, if necessary, to obtain perfect alignment.

The parts forming this pulley are usually highly finished during the machine operation and are then, if desired plated with chromium or some similar metal so as to improve their appearance and protect them against corrosion.

Having described the invention what is claimed as new is:

1. A pulley comprising, in combination, a tubular cylindrical hub having its outer surface provided with flat top threads, machined to form a cylindrical surface providing a bearing area, two annular flanged members secured to the hub, one being positioned near an end of the hub, means for securing the last named flanged member against accidental movement relative to the hub, the other annular flanged member having a cylindrical, tubular sleeve extending outwardly and provided on its inner surface with a length of thread to engage with the threads on the hub, the sleeve being provided with a plurality of longitudinal, angularly spaced slots, a split locking ring enclosing the sleeve, and means comprising a screw for forcing the locking ring against the outer surface of the split sleeve and the inner surface of the sleeve against the flat outer edge of the threads on the hub.

2. A pulley comprising, in combination, a tubular cylindrical hub having its outer surface provided with threads, two annular flanged members secured to the hub, one being positioned near one end of the hub, means for securing the last named flanged member against accidental movement relative to the hub, the other annular flanged member having a cylindrical, tubular sleeve extending outwardly and provided on its inner surface with threads to engage with the threads on the hub, the sleeve being provided with a plurality of longitudinal, angularly spaced slots, a split locking ring enclosing the sleeve, and means comprising a screw for forcing the locking ring against the outer surface of the split sleeve and the inner surface of the sleeve against the outer edges of the threads on the hub.

3. A pulley comprising, in combination, a tubular cylindrical hub having its outer surface provided with threads, two annular flanged members on the hub, one being positioned near one end of the hub, the last named flanged member being fixed against movement, the other annular flanged member having a cylindrical tubular sleeve extending outwardly and provided on its inner surface with threads to engage with the threads on the hub, the sleeve being provided with a plurality of longitudinal, angularly spaced slots, a split locking ring enclosing the sleeve, and means comprising a screw for forcing the locking ring against the outer surface of the split sleeve and the inner surface of the sleeve against the outer edges of the threads on the hub.

WILLIAM M. MUELLER.
J. E. HECKETHORN.

REFERENCES CITED

The following references are of record in the file of this patent:

UNITED STATES PATENTS

| Number | Name | Date |
|---|---|---|
| 101,824 | Clark | Apr. 12, 1870 |
| 671,274 | Fischer | Apr. 2, 1901 |
| 1,367,615 | Malone | Feb. 8, 1921 |
| 2,062,629 | Zimic | Dec. 1, 1936 |
| 2,187,188 | Whitcomb | Jan. 16, 1940 |
| 2,254,380 | Mitchell | Sept. 2, 1941 |